Aug. 30, 1932.    G. B. VOORHIES    1,874,665
SPRAY DRYING APPARATUS
Filed March 7, 1930
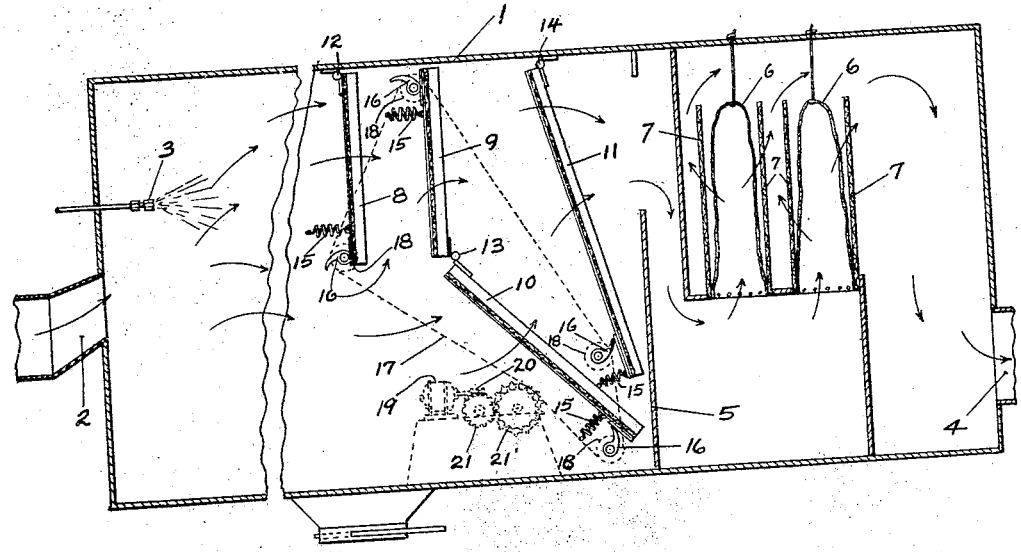
INVENTOR.
GRANTLAND B. VOORHIES.
BY Miller Boyken & Breed
ATTORNEYS.

Patented Aug. 30, 1932

1,874,665

UNITED STATES PATENT OFFICE

GRANTLAND B. VOORHIES, OF SAN FRANCISCO, CALIFORNIA, ASSIGNOR TO FEDERAL MILK COMPANY, OF SAN FRANCISCO, CALIFORNIA, A CORPORATION OF NEVADA

SPRAY DRYING APPARATUS

Application filed March 7, 1930. Serial No. 434,039.

This invention relates to spray drying apparatus of the type used in drying milk in the manufacture of powdered milk, and the objects of the invention are to provide improvements in such apparatus whereby liquids of a stickier or more hygroscopic nature may be dried more efficiently than with apparatus heretofore available.

The improvements are shown in the accompanying drawing in which the figure is a vertical section taken through a spray drying box or room incorporating my improvements.

In the spray drying of milk and similar liquids various forms of drying boxes are used, the precise nature of the liquid or resulting dried product determining the size of box, regulation of air currents, heat, etc., and in the drying of milk, usually having some or all of its butter fat removed, the bulk of the powder falls by gravity and the lighter particles carried along on the hot air stream are intercepted on cloth screens or bags through which the air passes at the remote end of the box before the air is drawn out or finally discharged from the box, and at the end of the run a workman enters the box to remove the powder which has piled up in the bottom as well as that which has accumulated upon the cloths.

However, in carrying out the process with material such as ice cream powder consisting of milk incorporating sugar, gelatine, vegetable oils, etc., the resulting powder being relatively sticky will speedily choke the cloth screens at the final end of the box so as to build up too much resistance for the proper flow of air to carry on the process, and the principal feature of my invention is the incorporating of auxiliary relatively coarse screens, preferably of metal mounted on rigid frames and which are arranged in a special way within the dying chamber and given periodic shocks to cause the powder to fall therefrom.

In the drawing the box 1 conveniently of about ten feet in height and about thirty or more feet in length, is provided with an inlet at 2 for large volume of heated air which is forced in from a source not shown and which is directed upward at an angle under the spray nozzle 3 from which the liquid is sprayed under a pressure of several thousand pounds per square inch and the fine particles robbed of their water are carried more or less horizontally toward the far end of the box toward final exit for the air at 4 which is subject to exhaustion from a fan not shown.

Most of the powder falls by gravity in the first two thirds of travel and the last third of the box is partially separated by a partition 5 so that the air currents take an upward turn, then a downward turn over the partition and then again upward through cloth screens 6 which are supported against coarse metal screens 7 and held tight thereagainst due to the air pressure from within the loops or bags of cloth.

When drying milk the forward part of the chamber usually contains no intercepting devices but when drying the more sticky powders mentioned I provide the specially pivoted screen frames 8, 9, 10 and 11 pivoted on fixed horizontal axes 12, 13 and 14 as indicated and each frame resiliently pulled at its free end by a spring as at 15 so that it will bear against a revolvable cam as at 16 shaped to permit the screen to snap back with a shock every time the high part of the cam rides over.

These cams are on short shafts projecting through the side of the drying box or chamber and are preferably all geared together by any suitable means such as the chain 17 and sprockets 18 all slowly revolved as by a motor 19 provided with a worm 20 operating on a gear 21 engaging a gear 21'.

The screens are not fine enough to actually screen the particles but are relatively coarse (about 16 mesh has been found satisfactory) as their function is to intercept or form a lighting place as it were for the passing powder particles which, owing to their adherent nature quickly build up upon them, yet preserve free spaces for passage of air through the screens.

The arrangement shown with frames 8 and 9 standing vertically extending about half way down, and frames 10 and 11 inclined, has been found satisfactory. It is understood that the frames extend substantially across the entire chamber.

With this arrangement, there is only about 8% of the powder carried over to the second part of the chamber to be screened by the cloth bags and since these have a comparatively large area no objectionable back pressure is built up.

These chambers are usually metal lined for easy cleaning and provided with doors for entry of a person to remove the powder, all as well understood and not involved in the present invention.

I claim:

1. In a spray drying apparatus for making powder from liquids and including a drying chamber, an intercepting screen within the chamber, and means for imparting a shock to said screen for dropping accumulated powder therefrom, said screen being relatively coarse to afford an attaching place for adhesive powder only and not to serve as a medium for filtering the powder from the air currents.

2. In a spray drying apparatus for making powder from liquids and including a drying chamber, a plurality of relatively rigid screens extending generally up and down and pivotally mounted at their upper edges in the chamber, said screens extending across the path of travel of the air currents in the chamber for intercepting the drying powder, and means for shocking the screens to drop the powder therefrom.

3. A spray drying box comprising an elongated horizontally extending chamber, means for spraying the material to be dried into one end of the chamber, a partition partially isolating the remote end of the chamber and forcing the air currents to make a turn thereover, a screen in the forward portion of the chamber through which the powder-laden air travels, said screen being relatively coarse to afford an attaching place for adhesive powder only and not to serve as a medium for filtering the powder from the air currents, and means in the remote end of the chamber for filtering the air substantially free from powder.

4. A spray drying box comprising an elongated horizontally extending chamber, means for spraying the material to be dried into one end of the chamber, a partition partially isolating the remote end of the chamber and forcing the air currents to make a turn thereover, a plurality of screens in the forward portion of the chamber through which the powder-laden air travels arranged above the floors of the chamber, said screens being relatively coarse to afford an attaching place for adhesive powder only and not to serve as a medium for filtering the powder from the air currents, and means in the remote end of the chamber for filtering the air substantially free from powder and means for shocking said screens.

5. In the spray drying of relatively sticky powders, a screen interposed in the path of the powder adapted for adherence of the powder and building up thereon and means for preserving passages larger than the powder granules through each mesh of the screen for free flow of air currents.

6. In a spray drying apparatus for making powder from liquids including a drying chamber, an intercepting screen within the chamber, said screen being relatively coarse to afford an attaching place for adhesive powder only and not to serve as a medium for filtering the powder from the air currents.

GRANTLAND B. VOORHIES.